(12) United States Patent
Barbosa et al.

(10) Patent No.: US 7,292,460 B2
(45) Date of Patent: Nov. 6, 2007

(54) CONVERTER CIRCUIT FOR SWITCHING A LARGE NUMBER OF SWITCHING VOLTAGE LEVELS

(75) Inventors: Peter Barbosa, Dättwil (CH); Jürgen Steinke, Albbruck (DE); Peter Steimer, Ehrendingen (CH); Luc Meysenc, Le Fontanil (FR); Thierry Meynard, L'Union (FR)

(73) Assignee: ABB Research Ltd., Zurich (CH)

( * ) Notice: Subject to any disclaimer, the term of this patent is extended or adjusted under 35 U.S.C. 154(b) by 15 days.

(21) Appl. No.: 10/575,852

(22) PCT Filed: Nov. 20, 2003

(86) PCT No.: PCT/CH03/00768

§ 371 (c)(1),
(2), (4) Date: Apr. 14, 2006

(87) PCT Pub. No.: WO2005/036719

PCT Pub. Date: Apr. 21, 2005

(65) Prior Publication Data

US 2007/0025126 A1    Feb. 1, 2007

(30) Foreign Application Priority Data

Oct. 17, 2003    (EP) .................................. 03405748

(51) Int. Cl.
*H02M 3/335*    (2006.01)
*H02M 7/44*    (2006.01)
*H02H 7/122*    (2006.01)

(52) U.S. Cl. ...................... 363/17; 363/56.03; 363/98; 363/132

(58) Field of Classification Search .................. 363/17, 363/56.02, 56.03, 56.05, 98, 132
See application file for complete search history.

(56) References Cited

U.S. PATENT DOCUMENTS 5,179,289 A * 1/1993 Sridharan .................... 307/110

(Continued)

FOREIGN PATENT DOCUMENTS

DE    692 05 413 T2    8/1993

(Continued)

*Primary Examiner*—Bao Q. Vu
(74) *Attorney, Agent, or Firm*—Buchanan Ingersoll & Rooney PC

(57) ABSTRACT

A converter circuit is specified for switching a large number of switching voltage levels, which has n first switching groups for each phase, with the n-th first switching group being formed by a first power semiconductor switch and a second power semiconductor switch, and with the first first switching group to the-th switching group each being formed by a first power semiconductor switch and a second power semiconductor switch and by a capacitor, which is connected to the first and second power semiconductor switches, with each of the n first switching groups being connected in series to the respectively adjacent first switching group, and with the first and the second power semiconductor switches in the first first switching group being connected to one another. In order to reduce the amount of electrical energy stored in the converter circuit, $n \geq 1$ and p second switching groups and p third switching groups are provided, which are each formed by a first power semiconductor switch and a second power semiconductor switch and by a capacitor which is connected to the first and second power semiconductor switches, where $p \geq 1$ and each of the p second switching groups is connected in series with the respectively adjacent second switching group, and each of the p third switching groups is connected in series with the respectively adjacent third switching group, and the first second switching group is connected to the first power semiconductor switch in the n-th first switching group, and the first third switching group is connected to the second power semiconductor switch in the n-th first switching group. Furthermore, the capacitor in the p-th second switching group is connected in series with the capacitor in the p-th third switching group.

21 Claims, 7 Drawing Sheets

U.S. PATENT DOCUMENTS

| | | |
|---|---|---|
| 5,737,201 A | 4/1998 | Meynard et al. |
| 5,940,285 A * | 8/1999 | Carrere et al. ................ 363/62 |
| 6,798,677 B2 * | 9/2004 | Jakob et al. ................ 363/123 |
| 6,879,503 B2 * | 4/2005 | Meynard et al. .............. 363/71 |
| 7,030,587 B2 * | 4/2006 | Anwar et al. ............... 318/701 |

FOREIGN PATENT DOCUMENTS

| | | |
|---|---|---|
| FR | 2 828 029 A1 | 1/2003 |
| WO | WO 01/93412 A2 | 12/2001 |

* cited by examiner

CONVERTER CIRCUIT FOR SWITCHING A LARGE NUMBER OF SWITCHING VOLTAGE LEVELS

DESCRIPTION

1. Technical Field

The invention relates to the field of power electronics and is based on a converter circuit for switching a large number of switching voltage levels, as claimed in the precharacterizing clause of the independent claim.

2. Prior Art

Nowadays, converter circuits are used in a wide range of power-electronic applications. The requirements for a converter circuit such as this are in this case firstly to produce as few harmonics as possible on phases of an electrical AC voltage network which is normally connected to the converter circuit, and on the other hand to transmit power levels that are as high as possible with the smallest possible number of electronic components. One suitable converter circuit for switching a large number of switching voltage levels is specified in DE 692 05 413 T2. In this document, n first switching groups are provided for each phase, with the n-th first switching group being formed by a first power semiconductor switch and a second power semiconductor switch, and the first first switching group to the (n−1)-th switching group each being formed by a first power semiconductor switch and a second power semiconductor switch and by a capacitor which is connected to the first and to the second power semiconductor switch, where n≧2. Each of the n first switching groups is connected in series with the respectively adjacent first switching group, with the first and the second power semiconductor switches in the first first switching group being connected to one another. The first and the second power semiconductor switches are in each case formed by an insulated gate bipolar transistor (IGBT) and by a diode connected back-to-back in parallel with the bipolar transistor.

A converter circuit for switching a large number of switching voltage levels according to DE 692 05 413 T2 is subject to the problem that the amount of electrical energy stored in the converter circuit during operation is very high. Since the electrical energy is stored in the capacitors in the n first switching groups of the converter circuit, the capacitors must be designed for this electrical energy, that is to say in terms of their withstand voltage and/or their capacitance. However, this necessitates capacitors with a large physical size, which are correspondingly expensive. Furthermore, because the physical size of the capacitors is large, the converter circuit requires a large amount of space, so that a space-saving design, as is required for many applications such as traction applications, is not possible. Furthermore, the use of the physically large capacitors results in a large amount of installation and maintenance effort.

DESCRIPTION OF THE INVENTION

One object of the invention is therefore to specify a converter circuit for switching a large number of switching voltage levels, which stores as little electrical energy as possible during its operation, and which can be produced in a space-saving manner. This object is achieved by the features of claim 1. Advantageous developments of the invention are specified in the dependent claims.

The converter circuit according to the invention for switching a large number of switching voltage levels has n first switching groups which are provided for each phase, with the n-th first switching group being formed by a first power semiconductor switch and a second power semiconductor switch, and the first first switching group to the (n−1)-th switching group each being formed by a first power semiconductor switch and a second power semiconductor switch and by a capacitor which is connected to the first and second power semiconductor switches, where, according to the invention, n≧1, and each of the n first switching groups when there are a plurality of first switching groups is connected in series with the respectively adjacent first switching group, and the first and the second power semiconductor switches in the first first switching group are connected to one another. According to the invention, p second switching groups and p third switching groups are provided, which are each formed by a first power semiconductor switch and a second power semiconductor switch and by a capacitor which is connected to the first and second power semiconductor switches, where p≧1 and each of the p second switching groups when there are a plurality of second switching groups being connected in series with the respectively adjacent second switching group. Each of the p third switching groups when there are a plurality of third switching groups is connected in series with the respectively adjacent third switching group, and the first second switching group is connected to the first power semiconductor switch in the n-th first switching group, and the first third switching group is connected to the second power semiconductor switch in the n-th first switching group. Furthermore, the capacitor in the p-th second switching group is connected in series with the capacitor in the p-th third switching group.

The p second switching groups and p third switching groups which are provided, together with their connections as described above mean that the p second switching groups are involved, for example, only during the positive half-cycle with respect to the phase output AC voltage, and the p third switching groups are involved only during the negative half-cycle, in operation of the converter circuit according to the invention. It is thus advantageously possible to reduce the amount of electrical energy which is stored in the converter circuit, in particular in the capacitors in the p second and third switching groups. Furthermore, the n first switching groups are used only for balancing the phase output AC voltage, so that, when there are a plurality of first switching groups, the capacitors in the n first switching groups essentially carry no current in the balanced state, and therefore essentially do not store any electrical energy either. The amount of stored electrical energy in the converter circuit can thus be kept low overall, so that the capacitors in the converter circuit need be designed only for a small amount of electrical energy to be stored, that is to say with respect to their withstand voltage and/or their capacitance. Because of the small physical size of the capacitors, the converter circuit requires very little space, thus advantageously allowing a space-saving design, as is required for many applications, for example for traction applications. Furthermore, the small physical size of the capacitors also advantageously makes it possible to keep the amount of installation and maintenance effort low.

These and further objects, advantages and features of the present invention will become evident from the following detailed description of preferred embodiments of the invention, in conjunction with the drawing.

Figure 1A:
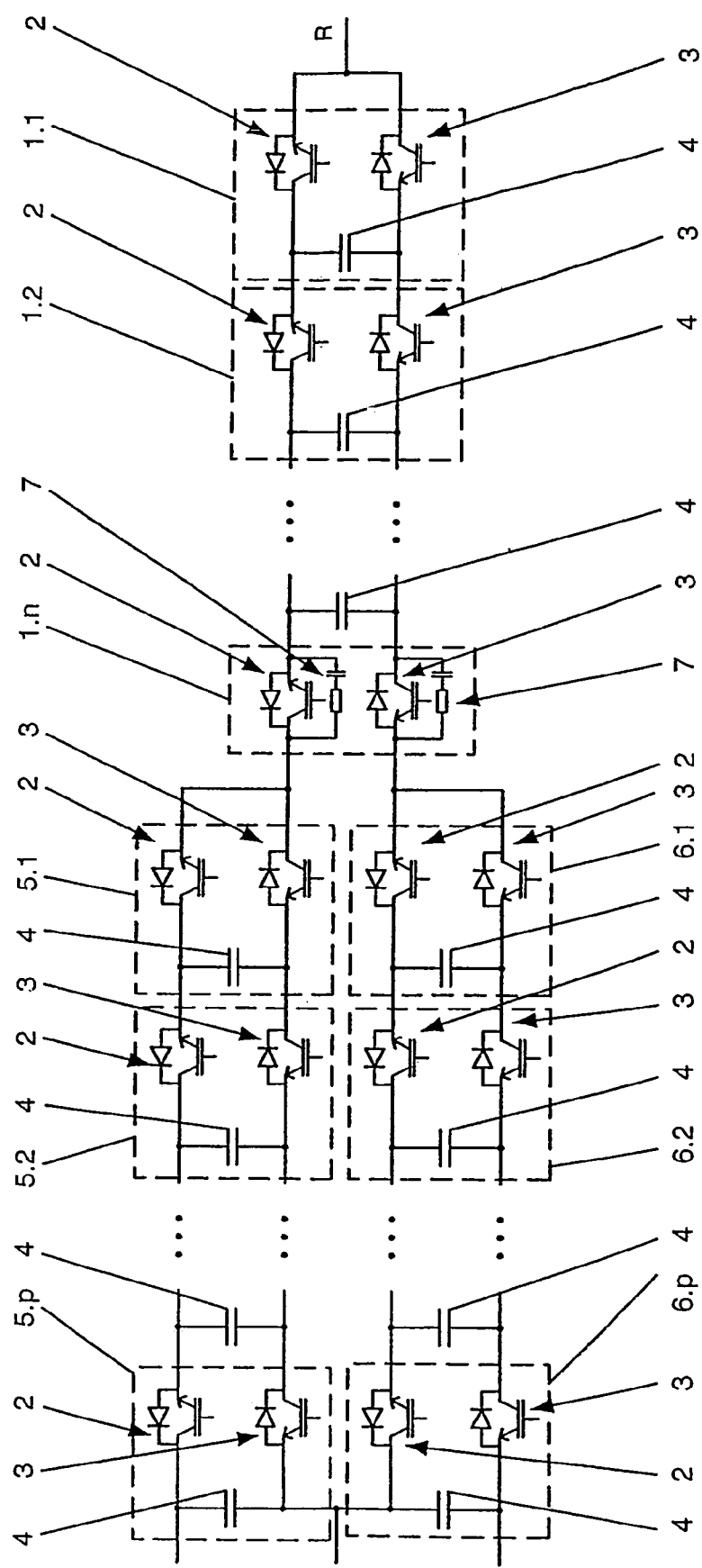
FIG. 1a shows a first embodiment of a converter circuit according to the invention.

The reference symbols used in the drawing and their meanings are listed in a summarized form in the list of reference symbols. In principle, identical parts are provided with the same reference symbols in the figures. The described embodiments represent examples of the subject matter of the invention, and have no restrictive effect.

WAYS TO IMPLEMENT THE INVENTION

FIG. 1a shows a (in particular single-phase) first embodiment of a converter circuit according to the invention for switching a large number of switching voltage levels. In this case, the converter circuit has n first switching groups 1.1, . . . , 1.n which are provided for each phase R, Y, B, with the n-th first switching group 1.n being formed by a first power semiconductor switch 2 and a second power semiconductor switch 3, and with the first first switching group 1.1 to the (n−1)-th switching group 1.(n−1) in each case being formed by a first power semiconductor switch 2 and a second power semiconductor switch 3, and by a capacitor 4 which is connected to the first and to the second power semiconductor switch 2, 3, in which case, according to the invention, $n \geq 1$. Since, as can be seen from FIG. 1a, each of the first switching groups 1, 1.1, . . . , 1.n represents a four-pole network, each of the n first switching groups 1.1, . . . , 1.n when there are a plurality of first switching groups 1.1, . . . , 1.n is connected in series with the respectively adjacent first switching group 1.1, . . . , 1.n, that is to say the n-th first switching group 1.n is connected in series with the (n−1)-th first switching group 1.(n−1), and the (n−1)-th first switching group 1.(n−1) is connected in series with the (n−2)-th first switching group 1.(n−2), etc. As can be seen from FIG. 1a, the first and the second power semiconductor switches 2, 3 in the first first switching group 1.1 are connected to one another. The junction point of the first and of the second power semiconductor switches 2, 3 in the first first switching group 1.1 forms a phase connection, in particular for the phase R, as shown in FIG. 1a.

Figure 2:
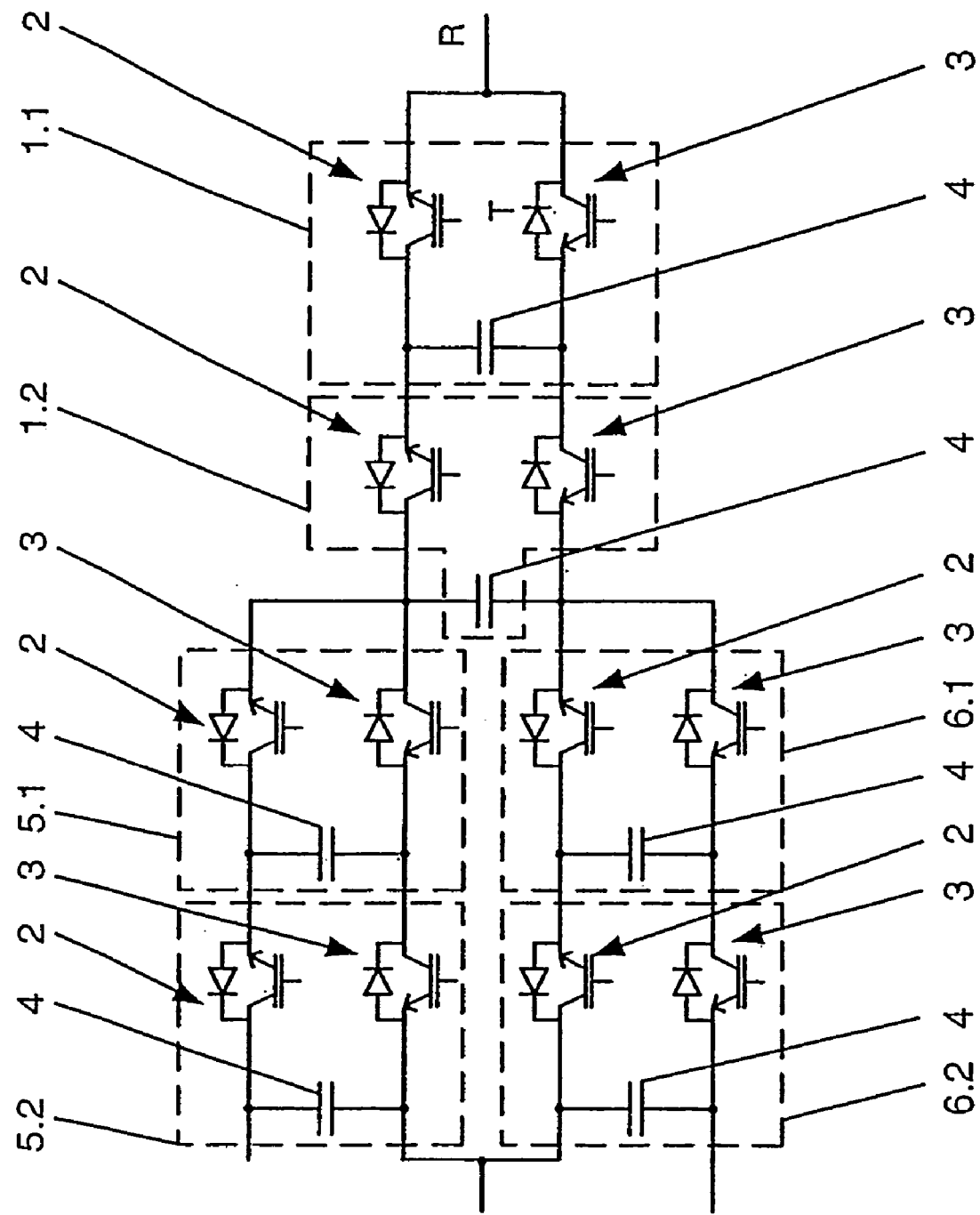
FIG. 2 shows a fourth embodiment of the converter circuit according to the invention.

According to the invention, and as shown in FIG. 1a, p second switching groups 5.1, . . . , 5.p and p third switching groups 6.1, . . . , 6.p are now provided and are each formed by a first power semiconductor switch 2 and a second power semiconductor switch 3, and by a capacitor 4 which is connected to the first and second power semiconductor switches 2, 3, where $p \geq 1$. Since, as shown in FIG. 2, each of the p second switching groups 5.1, . . . , 5.p and each of the p third switching groups 6.1, . . . , 6.p represents a four-pole network, each of the p second switching groups 5.1, . . . , 5.p when there are a plurality of second switching groups 5.1, . . . , 5.p is connected in series with the respectively adjacent second switching groups 5.1, . . . , 5.p, that is to say the p-th second switching group 5.p is connected in series with the (p−1)-th second switching group 5.(p−1), and the (p−1)-th second switching group 5.(p−1) is connected in series with the (p−2)-th second switching group 5.(p−2), etc. Furthermore, as shown in FIG. 1a, each of the p third switching group 6.1, . . . , 6.p when there are a plurality of third switching groups 6.1, . . ., 6.p is connected in series with the respectively adjacent third switching groups 6.1, . . ., 6.p, that is to say the p-th third switching group 6.p is connected in series with the (p−1)-th third switching group 6.(p−1), and the (p−1)-th third switching group 6.(p−1) is connected in series with the (p−2)-th third switching group 6.(p−2), etc.

Furthermore, the first second switching group 5.1 is connected to the first power semiconductor switch 2 in the n-th first switching group 1.n, and the first third switching group 6.1 is connected to the second power semiconductor switch 3 in the n-th first switching group 1.n. Finally, the capacitor 4 in the p-th second switching group 5.p is connected in series with the capacitor 4 in the p-th third switching group 6.p. The p second switching groups 5.1, . . . , 5.p and p third switching groups 6.1, . . . , 6.p that are provided and their described connections in each case between one another, to one another and to the n-th first switching group 1.n mean that the p second switching groups 5.1, . . . , 5.p are involved, for example, only in the positive half-cycle with respect to the phase output AC voltage, and the p third switching groups 6.1, . . . , 6.p are involved only in the negative half-cycle with respect to the phase output AC voltage, in the operation of the converter circuit according to the invention. The amount of electrical energy which is stored in the converter circuit, in particular in the capacitors 4 in the p second and third switching groups 5.1, . . . , 5.p; 6.1, . . . , 6.p can thus advantageously be reduced. Furthermore, the n first switching groups 1.1, . . . , 1.n are used only for balancing the phase output AC voltage, so that the capacitors 4 in the n first switching groups 1.1, . . . , 1.n essentially carry no current when the phase output AC voltage is in the balanced state, and essentially no electrical energy is stored in them either. The amount of electrical energy stored in the converter circuit according to the invention can thus be kept low overall, so that the capacitors 4 in the converter circuit need be designed only for a small amount of electrical energy to be stored, that is to say with respect to their withstand voltage and/or their capacitance. Because of the small physical size of the capacitors 4, the converter circuit requires a minimum amount of space, thus advantageously allowing a space-saving design, as is required for many applications, for example for traction applications. Furthermore, the small physical size of the capacitors 4 also advantageously makes it possible to keep the installation and maintenance effort low.

As shown in FIG. 1a, a voltage limiting network 7, for example, is connected in parallel with the first power semiconductor switch 2 in the n-th first switching group 1.n, and a voltage limiting network 7 is likewise connected in parallel with the second power semiconductor switch 3 in the n-th first switching group 1.n. The voltage limiting network 7 can optionally be chosen and is advantageously used to stabilize the phase output voltage, in particular when the desired phase output voltage is 0 V. The voltage limiting network 7 preferably has a capacitor or, as is shown in FIG. 1a, a series circuit formed by a resistor with a capacitor. It is obvious to a person skilled in the art that all the other first and second power semiconductor switches 2, 3 in the first switching groups 1.1, . . . , 1.(n−1) as well as the second and third switching groups 5.1, . . . , 5.p; 6.1, . . . , 6.p may also have a voltage limiting network 7, in particular of any type, and/or a current limiting network, in particular of any type.

Figure 1B:
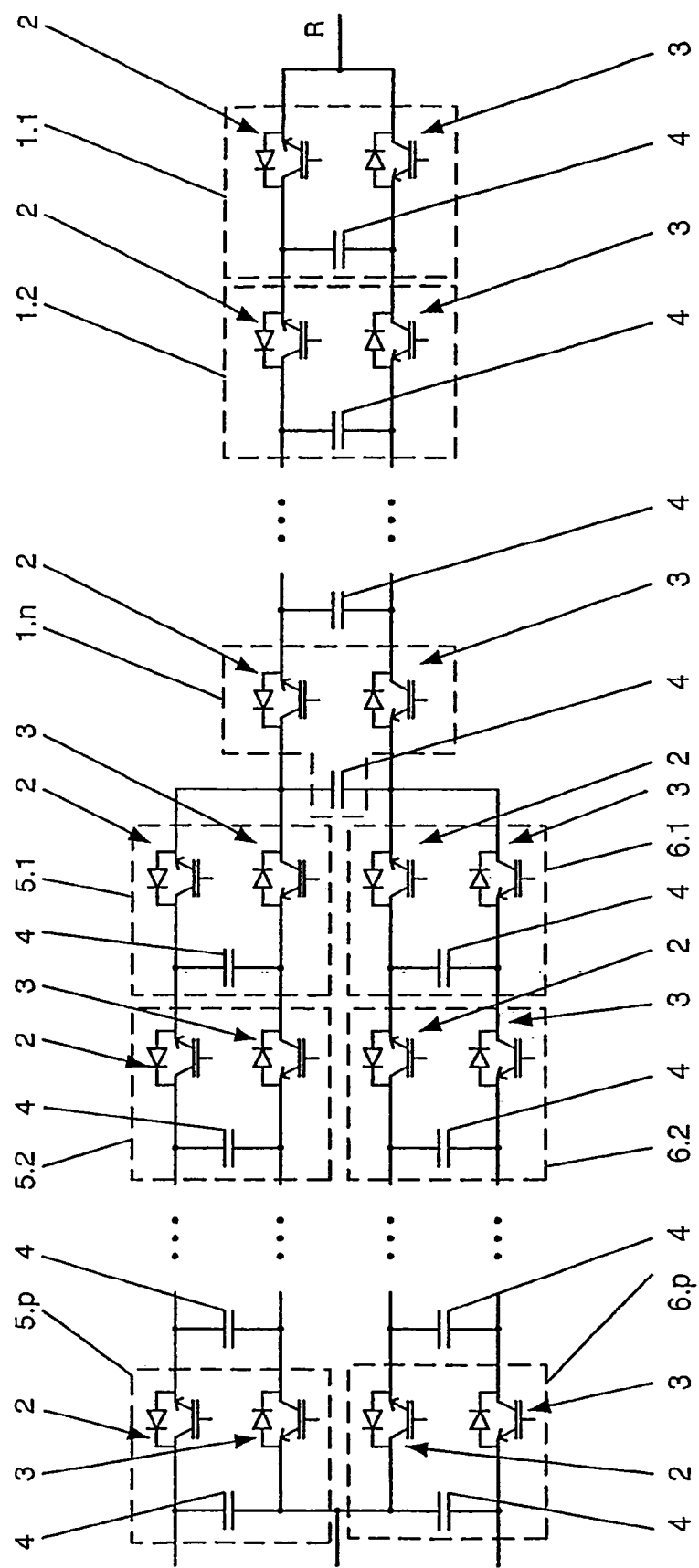
FIG. 1b shows a second embodiment of a converter circuit according to the invention.

FIG. 1b shows a (in particular single-phase) second embodiment of the converter circuit according to the invention for switching a large number of switching voltage levels. In contrast to the first embodiment shown in FIG. 1a, the n-th first switching group 1.n in the second embodiment as shown in FIG. 1b has a capacitor 4 which is connected to the first and second power semiconductor switches 2, 3 in the n-th first switching group 1.n, with the first second switching group 5.1 being connected to the capacitor 4 in the n-th first switching group 1.n, and the first third switching group 6.1 being connected to the capacitor 4 in the n-th first switching group 1.n. The capacitor 4 in the n-th first switching group 1.n advantageously results, particularly when the desired phase output voltage is 0 V, in this phase output voltage being stabilized, so that this can be achieved without any problems and without any disturbance effects. If the first embodiment as shown in FIG. 1a is compared with the second embodiment as shown in FIG. 1b, the capacitor 4 in the n-th first switching group 1.n can be chosen optionally, and is used only for voltage limiting or for voltage stabilization, and thus cannot be regarded as a voltage source. It is also feasible, although this is not shown in FIG. 1a for the sake of clarity, to provide a series circuit formed by the capacitor 4 with a resistor, instead of the capacitor 4 in the n-th first switching group 1.n. It is self-evident that the capacitor 4 in the n-th first switching group 1.n or the series circuit formed by the capacitor 4 with a resistor can be chosen optionally for all the described embodiments.

Figure 1C:
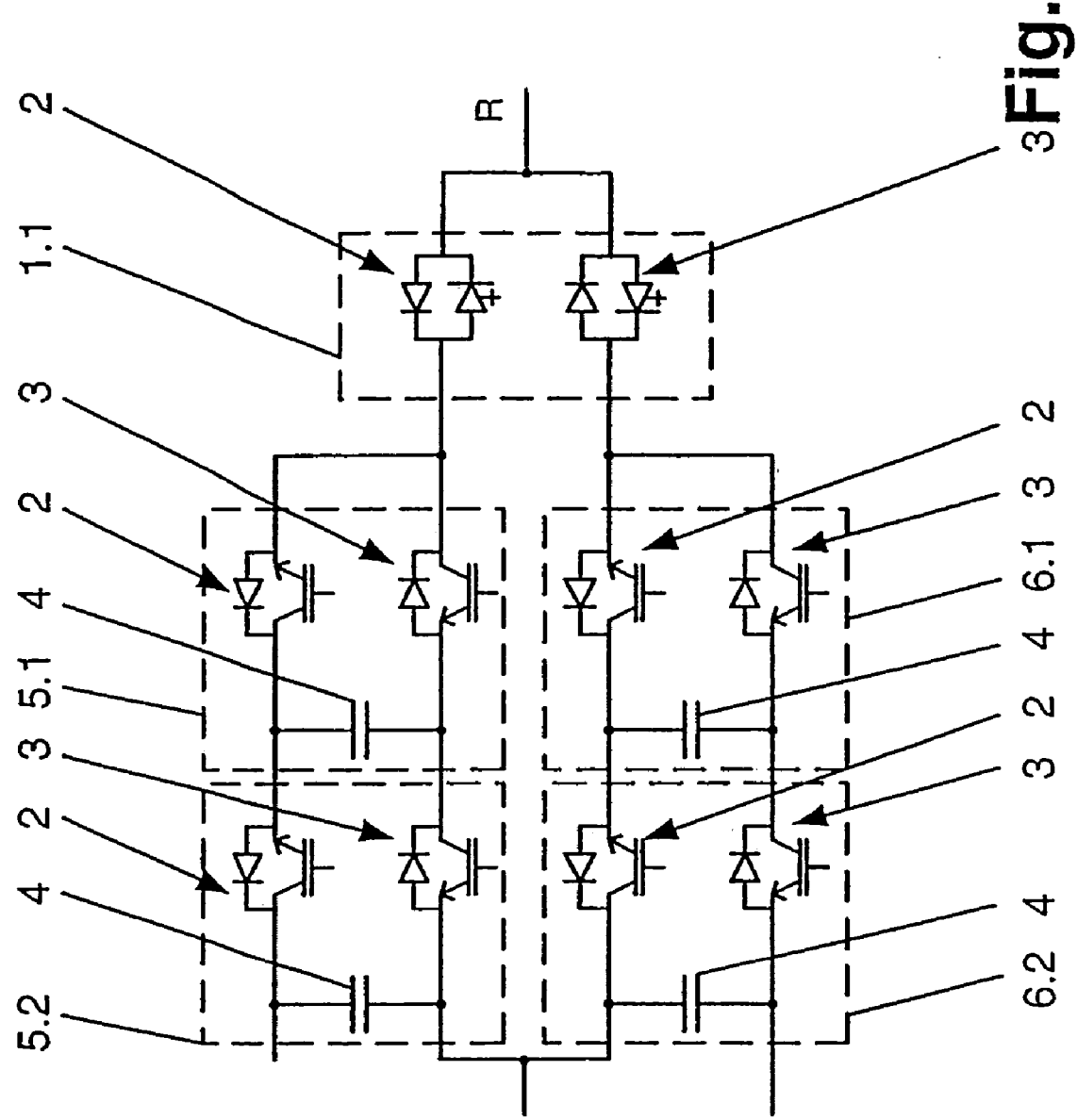
FIG. 1c shows a third embodiment of a converter circuit according to the invention.

FIG. 1c shows a (in particular single-phase) third embodiment of the converter circuit according to the invention for switching a large number of switching voltage levels. In this case, the total number of the n first switching groups 1.1, . . . , 1.n is less than the total number of the p second and third switching groups 5.1, . . . , 5.p; 6.1, . . . , 6.p. In FIG. 1c, these are then n=1 first switching groups 1.1, 1.2 and p=2 second switching groups 5.1, 5.2, as well as p=2 third switching groups 6.1, 6.2. This advantageously means that fewer first switching groups 1.1, . . . , 1.n and thus fewer first and second power semiconductor switches 2, 3 and fewer capacitors 4 are required, and the total space required for the converter circuit according to the invention can thus be reduced further. The first and second power semiconductor switches when there are n=1 first switching groups 1.1, 1.2, as is shown by way of example in FIG. 1c, are preferably each formed by a high blocking-capability bidirectional power semiconductor switch that is to say by a drivable high blocking-capability electronic component which carries currents in only one direction, for example by a gate turn-off thyristor (GTO thyristor) or an integrated thyristor with a commutated drive electrode (IGCT—integrated gate commutated thyristor), and by a passive high blocking-capability electronic component which is connected back-to-back in parallel with this, cannot be driven and carries current in only one direction, for example by a diode.

FIG. 2 shows a (in particular single-phase) fourth embodiment of the converter circuit according to the invention for switching a large number of switching voltage levels. In this case, the total number of the n first switching groups 1.1, . . . , 1.n corresponds to the total number of the p second and third switching groups 5.1, . . . , 5.p; 6.1, . . . , 6.p. In FIG. 2, these are then n=2 first switching groups 1.1, 1.2 and p=2 second switching groups 5.1, 5.2, as well as p=2 third switching groups 6.1, 6.2. If the total number of the n first switching groups 1.1, . . . , 1.n corresponds to the total number of the p second and third switching groups 5.1, . . . , 5.p; 6.1, . . . , 6.p then it is advantageously in general possible to switch (2n+1) switching voltage levels in the converter circuit according to the invention, that is to say, if n=2 as shown in FIG. 2, five switching voltage levels can then be switched.

Furthermore, it is also feasible for the total number of the n first switching groups 1.1, . . . , 1.n to be greater than the total number of the p second and third switching groups 5.1, . . . , 5.p; 6.1, . . . , 6.p.

As shown in FIG. 1a and FIG. 1c, the first and second power semiconductor switches 2, 3 in the first second switching group 5.1 are connected to one another, with the junction point of the first and second power semiconductor switches 2, 3 in the first second switching group 5.1 being connected to the first power semiconductor switch 2 in the n-th first switching group 1.n. Furthermore, as shown in FIG. 1a and FIG. 1c, the first and second power semiconductor switches 2, 3 in the first third switching group 6.1 are connected to one another, with the junction point of the first and second power semiconductor switches 2, 3 in the first third switching group 6.1 being connected to the second power semiconductor switch 3 in the n-th first switching group 1.n.

As shown in FIG. 1b, the first and second power semiconductor switches 2, 3 in the first second switching group 5.1 are connected to one another, with the junction point of the first and second power semiconductor switches 2, 3 in the first second switching group 5.1 being connected to the junction point of the capacitor 4 in the n-th first switching group 1.n and the first power semiconductor switch 2 in the n-th switching group 1.n. Furthermore, the first and second power semiconductor switches 2, 3 in the first third switching group 6.1 are connected to one another, with the junction point of the first and second power semiconductor switches 2, 3 in the first third switching group 6.1 being connected to the junction point of the capacitor 4 in the n-th first switching group 1.n and the second power semiconductor switch 3 in the n-th first switching group 1.n.

The first power semiconductor switch 2 and the second power semiconductor switch 3 in each switching group 1.1, . . . , 1.n; 5.1, . . . , 5.p; 6.1, . . . , 6.p are preferably each in the form of a bidirectional power semiconductor switch, as in the case of the embodiment shown in FIG. 1a, FIG. 1b, FIG. 1c and FIG. 2.

Figure 3A:
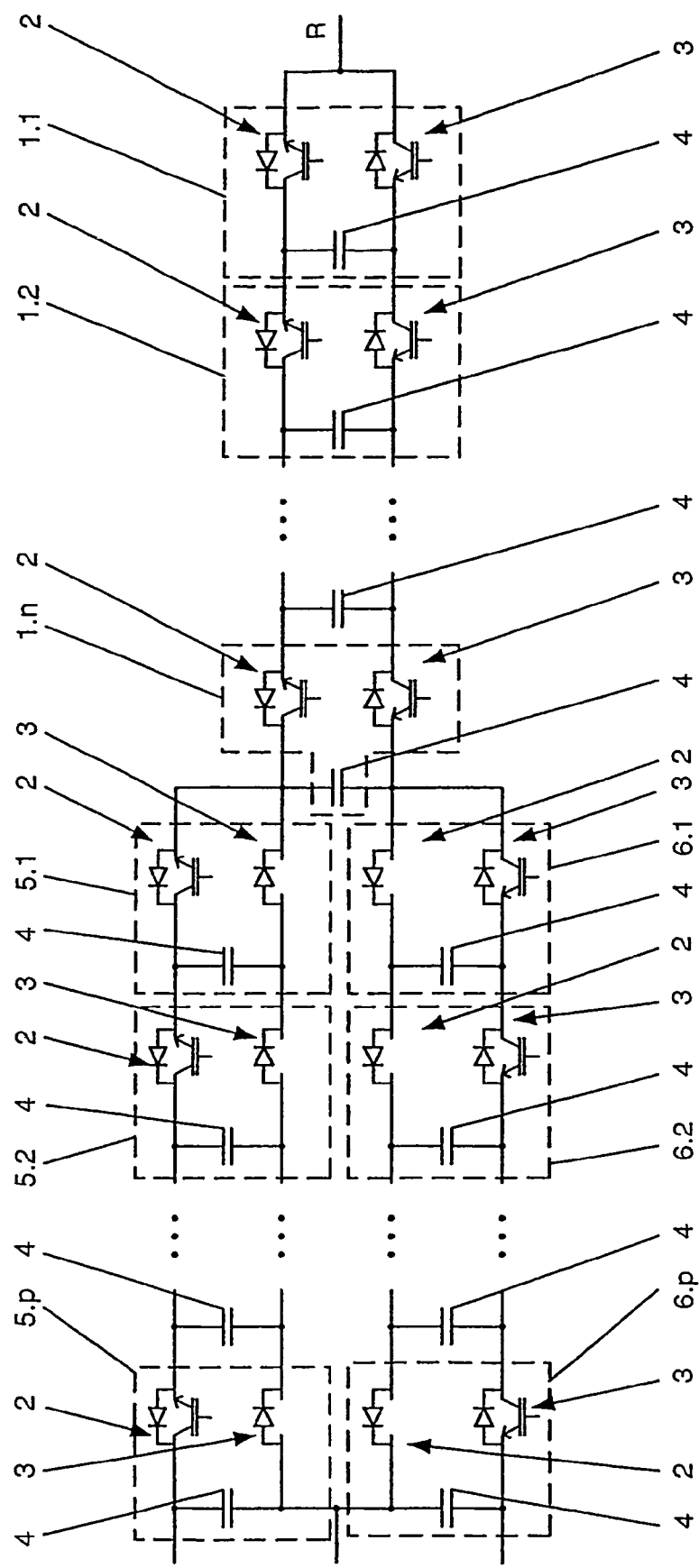
FIG. 3a shows a fifth embodiment of the converter circuit according to the invention.

FIG. 3a shows a (in particular single-phase) fifth embodiment of the converter circuit according to the invention for switching a large number of switching voltage levels. As shown in FIG. 3a, the first power semiconductor switch 2 in each first and in each second switching group 1.1, . . . , 1.n; 5.1, . . . , 5.p is a bidirectional power semiconductor switch. Furthermore, the second power semiconductor switch 3 in each first switching group 1.1, . . . , 1.n and in each third switching group 6.1, . . . , 6.p is a bidirectional power semiconductor switch. In contrast to the embodiments shown in FIG. 1a, FIG. 1b, FIG. 1c and FIG. 2, the second power semiconductor switch 3 in each second switching group 5.1, . . . , 5.p and the first power semiconductor switch 2 in each third switching group 6.1, . . . , 6.p is a unidirectional power semiconductor switch. This measure makes it possible to further simplify the converter circuit according to the invention.

Figure 3B:
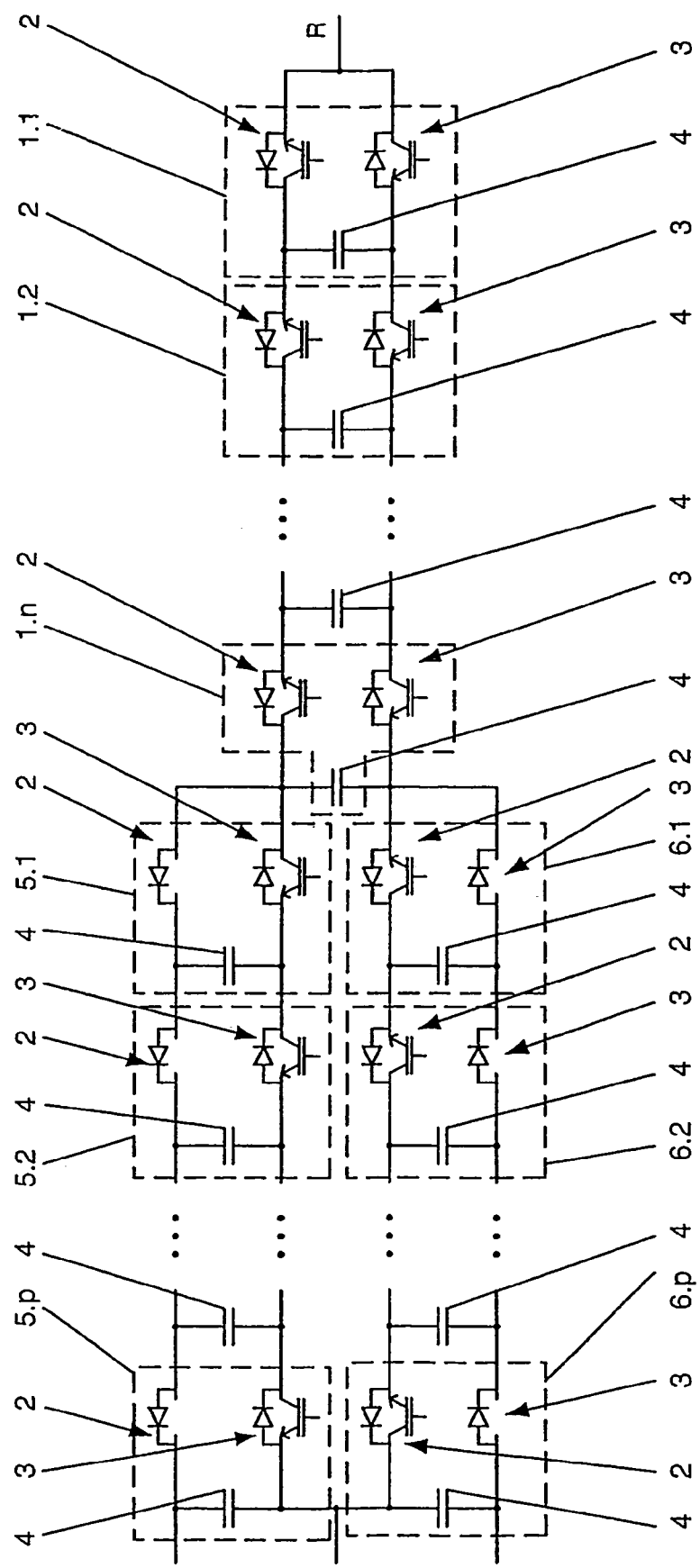
FIG. 3b shows a sixth embodiment of the converter circuit according to the invention.

FIG. 3b shows a (in particular single-phase) sixth embodiment of the converter circuit according to the invention for switching a large number of switching voltage levels. As shown in FIG. 3b, the first power semiconductor switch 2 in each first and in each third switching group 1.1, . . . , 1.n; 6.1, . . . , 6.p is a bidirectional power semiconductor switch. Furthermore, the second power semiconductor switch 3 in each first and in each second switching group 1.1, . . . , 1.n; 5.1, . . . , 5.p is a bidirectional power semiconductor switch. In addition, the first power semiconductor switch 2 in each second switching group 5.1, . . . , 5.p and the second power semiconductor switch 3 in each third switching group 6.1, ..., 6.p is a unidirectional power semiconductor switch. In addition to the advantages, as already mentioned for the fifth embodiment shown in FIG. 3a, of simplification of the converter circuit, the voltage across the respective capacitors 4 in each second and third switching group 5.1, ..., 5.p; 6.1, ..., 6.p in the sixth embodiment of the converter circuit as shown in FIG. 3b can also be set very easily, for example to a predetermined value, in particular by means of regulation.

Figure 4:
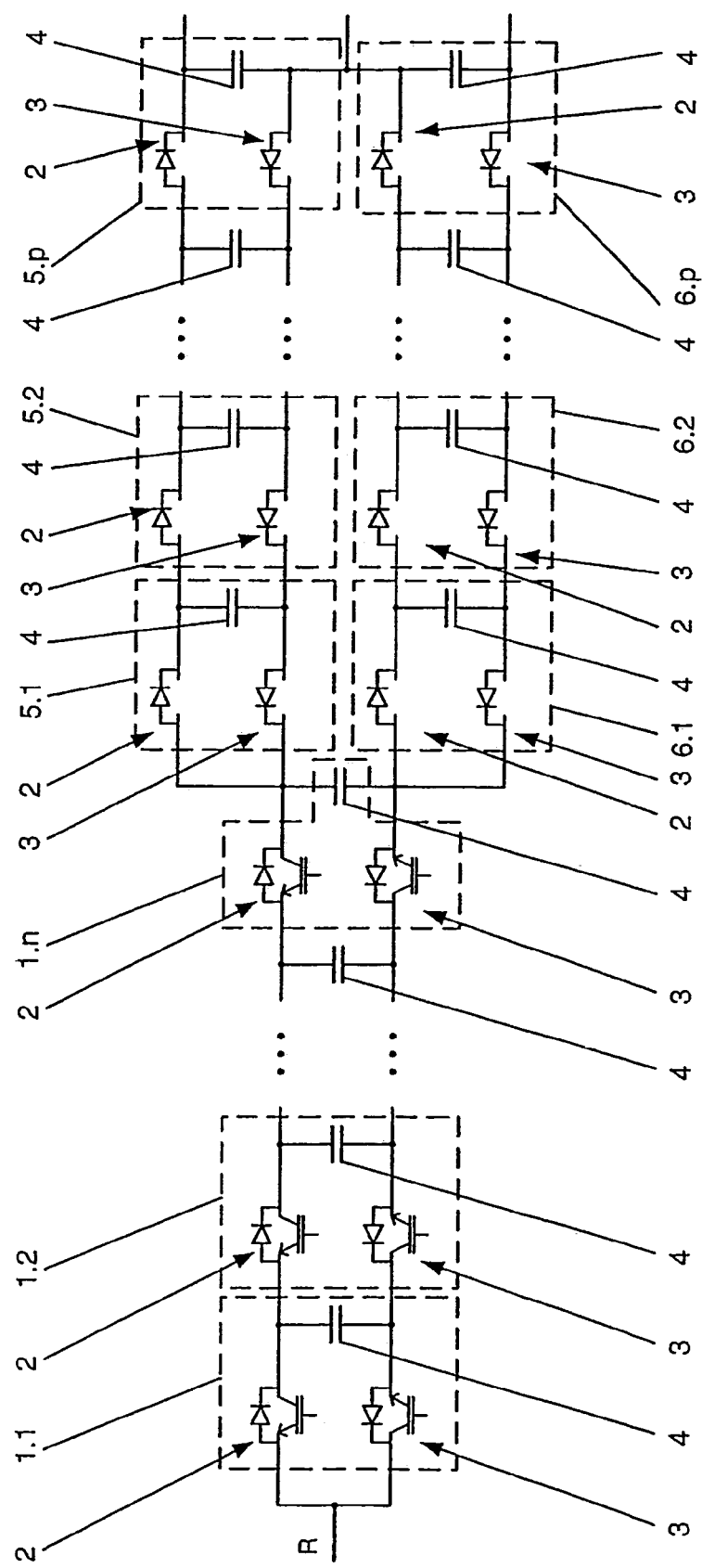
FIG. 4 shows a seventh embodiment of the converter circuit according to the invention.

FIG. 4 shows a (in particular single-phase) seventh embodiment of the converter circuit according to the invention for switching a large number of switching voltage levels. In this case, the first power semiconductor switch 2 and the second power semiconductor switch 3 in each first switching group 1.1, ..., 1.n is a bidirectional power semiconductor switch. Furthermore, the first power semiconductor switch 2 and the second power semiconductor switch 3 in each second switching group 5.1, ..., 5.p and in each third switching group 6.1, ..., 6.p is a unidirectional power semiconductor switch. This measure results in the converter circuit according to the invention becoming a rectifier, which is designed in a very simple and furthermore space-saving manner, since it requires only a minimal number of bidirectional power semiconductor switches.

Each of the bidirectional power semiconductor switches in the embodiments of the converter circuit according to the invention shown in FIG. 1a to FIG. 4 is preferably formed by an electronic component which can be driven and carries current in only one direction, for example by an insulated gate bipolar transistor (IGBT) or, as shown in FIG. 1c and as already mentioned, by a gate turn-off thyristor (GTO) or by an integrated gate commutated thyristor (IGCT), and by a passive electronic component, which is connected back-to-back in parallel with this, cannot be driven and carries current in only one direction, for example by a diode. The first and second power semiconductor switches 2, 3, which are in the form of bidirectional power semiconductor switches as shown in FIG. 1a, FIG. 1b, FIG. 1c and FIG. 2 are connected within the respective switching group 1.1, ..., 1.n; 5.1, ..., 5.p; 6.1, ..., 6.p in such a way that they have opposite main controlled current directions, that is to say the electronic components which can be driven and carry current in only one direction have opposite main controlled current directions to one another. Furthermore, the passive electronic components which cannot be driven and carry current in only one direction in the first and second power semiconductor switches 2, 3, as shown in FIG. 1a, FIG. 1b, FIG. 1c and FIG. 2 are connected within the respective switching group 1.1, ..., 1.n; 5.1, ..., 5.p; 6.1, ..., 6.p in such a way that they have a mutually opposite controlled current direction.

Furthermore, each of the unidirectional power semiconductor switches are based on the embodiments of the converter circuit according to the invention as shown in FIGS. 3a, b and FIG. 4 is preferably formed by a passive electronic component which cannot be driven and carries current in only one direction, for example by a diode. As already mentioned, the converter circuit according to the invention and as shown in FIGS. 3a, b and FIG. 4 can be further simplified by this measure because fewer electronic components which can be driven and carry current in only one direction are required, and the drive complexity can thus be significantly reduced. The first and second power semiconductor switches 2, 3 which are in the form of bidirectional power semiconductor switches as shown in FIGS. 3a, b and FIG. 4 are connected within the respective first switching groups 1.1, ..., 1.n in such a way that they have an opposite controlled main current direction, that is to say the electronic components which can be driven and carry current in only one direction have a mutually opposite controlled main current direction. Furthermore, as shown in FIGS. 3a, b for the respective second and third switching groups 5.1, ..., 5.p; 6.1, ..., 6.p, the passive electronic component which cannot be driven and carries current in only one direction in the first and second power semiconductor switches 2, 3 and the electronic component which can be driven and carries current in only one direction in the first and second power semiconductor switches 2, 3 are connected within the respective second and third switching groups 5.1, ..., 5.p; 6.1, ..., 6.p in such a way that they have a mutually opposite current direction. Finally, the first and second power semiconductor switches 2, 3, which are in the form of unidirectional power semiconductor switches as shown in FIG. 4, within the respective second and third switching groups 5.1, ..., 5.p; 6.1, ..., 6.p are connected in such a way that they have a mutually opposite current direction.

Furthermore, it has been found to be very advantageous in the case of the n first switching groups 1.1, ..., 1.n to integrate the two first power semiconductor switches 2 in respectively adjacent first switching groups 1.1, ..., 1.n in a module, that is to say when there are a plurality of first switching groups 1.1, ..., 1.n, the first power semiconductor switch 2 in the n-th first switching group 1.n and the first power semiconductor switch 2 in the (n−2)-th first switching group 1.(n−1) are integrated in a module, and the first power semiconductor switch 2 in the (n−1)-th first switching group 1.(n−1) and the first power semiconductor switch 2 in the (n−2)-th first switching group 1.(n−2) are integrated in a module, etc. Furthermore, it has been found to be advantageous, in the case of the n first switching groups 1.1, ..., 1.n, for the two second power semiconductor switches 3 in respectively adjacent first switching groups 1.1, ..., 1.n to be integrated in a module, that is to say, when there are a plurality of first switching groups 1.1, ..., 1.n, the second power semiconductor switch 3 in the n-th first switching group 1.n and the second power semiconductor switch 3 in the (n−1)-th first switching group 1.(n−1) are integrated in a module, and the second power semiconductor switch 3 in the (n−1)-th first switching group 1.(n−1) and the second power semiconductor switch 3 in the (n−2)-th first switching group 1.(n−2) are integrated in a module, etc. Modules such as these are normally standard half-bridge modules and are accordingly of simple design, are not susceptible to faults, and are thus cost-effective. Furthermore, when there are a plurality of second switching groups 5.1, ..., 5.p it has been found to be advantageous, in the case of the p second switching groups 5.1, ..., 5.p, for the two first power semiconductor switches 2 in respectively adjacent second switching groups 5.1, ..., 5.p to be integrated in a module, and for the two second power semiconductor switches 3 in respectively adjacent second switching groups 5.1, ..., 5.p to be integrated in a module, in the manner described in detail above for the first switching groups 1.1, ..., 1.n. Furthermore, when there are a plurality of third switching groups 6.1, ..., 6.p, it has been found to be advantageous, in the case of the p third switching groups 6.1, ..., 6.p, for the two first power semiconductor switches 2 in respectively adjacent third switching groups 6.1, ..., 6.p to be integrated in a module, and for the two second power semiconductor switches 3 in respectively adjacent third switching groups 6.1, ..., 6.p to be integrated in a module, in the manner described in detail above for the first switching groups 1.1, ..., 1.n. It is self-evident that the integration, as explained in detail above, of the respective first and second power semiconductor switches 2, 3 applies to all of the embodiments of the converter circuit according to the invention as shown in FIG. 1a to FIG. 4.

However, it is also feasible, in the case of the n first switching groups 1.1, ..., 1.n, in the case of the p second and third switching groups 5.1, ..., 5.p; 6.1, ..., 6.p to in each case integrate the first power semiconductor switch 2 and the second power semiconductor switch 3 in a module. As already mentioned, modules such as these are normally standard half-bridge modules and are accordingly of simple design, are not susceptible to faults, and are thus cost-effective. In this case as well, it is self-evident that the integration, as explained in detail above, of the respective first and second power semiconductor switches 2, 3 applies to all the embodiments of the converter circuit according to the invention as shown in FIG. 1a to FIG. 4.

In the case of a converter circuit according to the invention that is intended to be provided for a polyphase application, the p-th second switching groups 5.p for the phases R, Y, B are preferably connected in parallel, and the p-th third switching groups 6.p for the phases R, Y, B are connected in parallel with one another. The respective connections are made to the capacitors 4 in the respective p-th second switching groups 5.p, and to the capacitors 4 in the respective p-th third switching groups 6.p, respectively.

In order advantageously to allow space to be saved in the case of a polyphase converter circuit, the capacitors 4 in the p-th second switching groups 5.p for the phases R, Y, B are preferably combined to form one capacitor. Furthermore, the capacitors 4 in the p-th third switching groups 6.b for the phases R, Y, B are preferably likewise combined to form one capacitor.

Overall, the converter circuit according to the invention for switching a large number of switching voltage levels thus represents a solution which is characterized by storing only a small amount of electrical energy during its operation and by its space-saving design, and thus represents a solution which is uncomplicated, robust and is not susceptible to defects.

LIST OF REFERENCE SYMBOLS

1.1, ..., 1.n First switching groups
2 First power semiconductor switch
3 Second power semiconductor switch
4 Capacitor
5.1, ..., 5.p Second switching groups
6.1, ..., 6.p Third switching groups
7 Voltage limiting network

The invention claimed is:

1. A converter circuit for switching a large number of switching voltage levels, having n first switching groups which are provided for each phase (R, Y, B), with the n-th first switching group being formed by a first power semiconductor switch and a second power semiconductor switch, and with the first first switching group to the (n−1)-th switching group each being formed by a first power semiconductor switch and a second power semiconductor switch and by a capacitor, which is connected to the first and second power semiconductor switches, with each of the n first switching groups being connected in series to the respectively adjacent first switching group, and with the first and the second power semiconductor switches in the first first switching group being connected to one another, wherein $n \geq 1$ and p second switching groups and p third switching groups are provided, which are each formed by a first power semiconductor switch and a second power semiconductor switch and by a capacitor which is connected to the first and second power semiconductor switches, where $p \geq 1$ and each of the p second switching groups is connected in series with the respectively adjacent second switching group, and each of the p third switching groups is connected in series with the respectively adjacent third switching group, and the first second switching group is connected to the first power semiconductor switch in the n-th first switching group, and the first third switching group is connected to the second power semiconductor switch in the n-th first switching group, and in that the capacitor in the p-th second switching group is connected in series with the capacitor in the p-th third switching group.

2. The converter circuit as claimed in claim 1, wherein a voltage limiting network is connected in parallel with the first power semiconductor switch in the n-th first switching group, and in that a voltage limiting network is connected in parallel with the second power semiconductor switch in the n-th first switching group.

3. The converter circuit as claimed in claim 2, wherein the voltage limiting network (7) has a capacitor.

4. The converter circuit as claimed in claim 2, wherein the voltage limiting network has a series circuit formed by a resistor with a capacitor.

5. The converter circuit as claimed in claim 1, wherein the n-th first switching group has a capacitor which is connected to the first and second power semiconductor switches in the n-th first switching group, with the first second switching group being connected to the capacitor in the n-th first switching group, and with the first third switching group being connected to the capacitor in the n-th first switching group.

6. The converter circuit as claimed in claim 1, wherein the first and second power semiconductor switches in the first second switching group are connected to one another, with the junction point of the first and second power semiconductor switches in the first second switching group being connected to the first power semiconductor switch in the n-th first switching group, and in that the first and second power semiconductor switches in the first third switching group are connected to one another, with the junction point of the first and second power semiconductor switches in the first third switching group being connected to the second power semiconductor switch in the n-th first switching group.

7. The converter circuit as claimed in claim 5, wherein the first and second power semiconductor switches in the first second switching group are connected to one another, with the junction point of the first and second power semiconductor switches in the first second switching group being connected to the junction point of the capacitor in the n-th first switching group and the first power semiconductor switch in the n-th first switching group, and in that the first and second power semiconductor switches in the first third switching group are connected to one another, with the junction point of the first and second power semiconductor switches in the first third switching group being connected to the junction point of the capacitor in the n-th first switching group and the second power semiconductor switch in the n-th first switching group.

8. The converter circuit as claimed in claim 1, wherein the total number of then first switching groups corresponds to the total number of the p second and third switching groups.

9. The converter circuit as claimed in claim 1, wherein the total number of the n first switching groups is less than the total number of the p second and third switching groups.

10. The converter circuit as claimed in claim 1, wherein the total number of the n first switching groups is greater than the total number of the p second and third switching groups.

11. The converter circuit as claimed in claim 1, wherein the first power semiconductor switch and the second power semiconductor switch in each switching group are in each case in the form of a bidirectional power semiconductor switch.

12. The converter circuit as claimed in claim 1, wherein the first power semiconductor switch in each first and in each second switching group is a bidirectional power semiconductor switch, wherein the second power semiconductor switch in each first and in each third switching group is a bidirectional power semiconductor switch, and wherein the second power semiconductor switch in each second switching group and the first power semiconductor switch in each third switching group are in each case in the form of a unidirectional power semiconductor switch.

13. The converter circuit as claimed in claim 1, wherein the first power semiconductor switch in each first and in each third switching group is a bidirectional power semiconductor switch, wherein the second power semiconductor switch in each first and in each second switching group is a bidirectional power semiconductor switch, and wherein the first power semiconductor switch in each second switching group and the second power semiconductor switch in each third switching group is a unidirectional power semiconductor switch.

14. The converter circuit as claimed in claim 1, wherein the first power semiconductor switch and the second power semiconductor switch in each first switching group are in each case in the form of a bidirectional power semiconductor switch, and wherein the first power semiconductor switch and the second power semiconductor switch in each second switching group and in each third switching group are in each case in the form of a unidirectional power semiconductor switch.

15. The converter circuit as claimed in claim 11, wherein the bidirectional power semiconductor switch is formed by an electronic component which can be driven and carries current in only one direction, and by a passive electronic component which is connected back-to-back in parallel with this, cannot be driven and carries current in only one direction.

16. The converter circuit as claimed in claim 12, wherein the unidirectional power semiconductor switch is formed by a passive electronic component which cannot be driven and carries current in only one direction.

17. The converter circuit as claimed in claim 1, wherein, in the case of the n first switching groups, the two first power semiconductor switches in respectively adjacent first switching groups are integrated in a module, and the two second power semiconductor switches in respectively adjacent first switching groups are integrated in a module.

18. The converter circuit as claimed in claim 17, wherein, in the case of the p second switching groups, the two first power semiconductor switches in respectively adjacent second switching groups are integrated in a module, and the two second power semiconductor switches in respectively adjacent second switching groups are integrated in a module, and wherein, in the case of the p third switching groups, the two first power semiconductor switches in respectively adjacent third switching groups are integrated in a module, and the two second power semiconductor switches in respectively adjacent third switching groups are integrated in a module.

19. The converter circuit as claimed in claim 1, wherein, in the case of the n first switching groups and in the case of the p second and third switching groups, the first power semiconductor switch and the second power semiconductor switch are in each case integrated in a module.

20. The converter circuit as claimed in claim 1, wherein, if there are a plurality of phases (R, Y, B), the p-th second switching groups for the phases (R, Y, B) are connected in parallel with one another, and the p-th third switching groups for the phases (R, Y, B) are connected in parallel with one another.

21. The converter circuit as claimed in claim 20, wherein the capacitors in the p-th second switching groups for the phases (R, Y, B) are combined to form one capacitor, and wherein the capacitors in the p-th third switching groups for the phases (R Y, B) are combined to form one capacitor.

* * * * *